Nov. 16, 1948.  R. G. LE TOURNEAU  2,454,070
TWO-WHEEL TRACTOR

Filed April 22, 1946  4 Sheets-Sheet 2

INVENTOR.
R. G. Le Tourneau
BY
*[signature]*
ATTYS

Nov. 16, 1948.  R. G. LE TOURNEAU  2,454,070
TWO-WHEEL TRACTOR

Filed April 22, 1946  4 Sheets-Sheet 4

INVENTOR
R.G. LeTourneau
BY
ATTORNEYS

Patented Nov. 16, 1948

2,454,070

UNITED STATES PATENT OFFICE 2,454,070

TWO-WHEEL TRACTOR

Robert G. Le Tourneau, Peoria, Ill., assignor to R. G. Le Tourneau Inc., Stockton, Calif., a corporation of California Application April 22, 1946, Serial No. 664,079

6 Claims. (Cl. 180—29)

1

This invention relates in general to an improved tractor, and in particular is directed to a two-wheel tractor of the "Tournapull" type, as used in unitary connection with trailing earth working and construction implements to propel the same.

One of the objects of the present invention is to provide a two-wheel tractor wherein the engine and the operator's seat are mounted in mainly laterally offset relation to each other so that the operator's straight-ahead vision is materially improved over conventional designs wherein the seat is directly to the rear of the engine.

Another object of the present invention is to incorporate, in the tractor, a heavy-duty, tractor engine driven generator adapted to supply electricity for the operation of an electric power steer on the tractor, and such electrically actuated mechanisms as the trailing implement may include; the offsetting of the tractor engine, as described, being advantageous in this regard as it thus permits the generator to be mounted within the main frame of the tractor alongside the lower portion of the engine.

A further object of the invention is to provide, in a two-wheel tractor which includes a final drive housing between the wheels, an integral fuel tank on the back of the final drive housing and projecting some distance rearwardly therefrom in normally ground clearance relation; said fuel tank being of rugged construction and, in addition to its function as a fuel reservoir, the tank serves effectively as a ground engaging stop to prevent the tractor from overturning rearwardly about the wheels as an axis.

An additional object of the invention is to provide a final drive assembly which is simplified but rugged in construction, and requires a minimum of maintenance and service.

These objects are accomplished by means of such structure and relative arrangement of parts as will fully appear by a perusal of the following specification and claims.

In the drawings similar characters of reference indicate corresponding parts in the several views.

Figure 1:
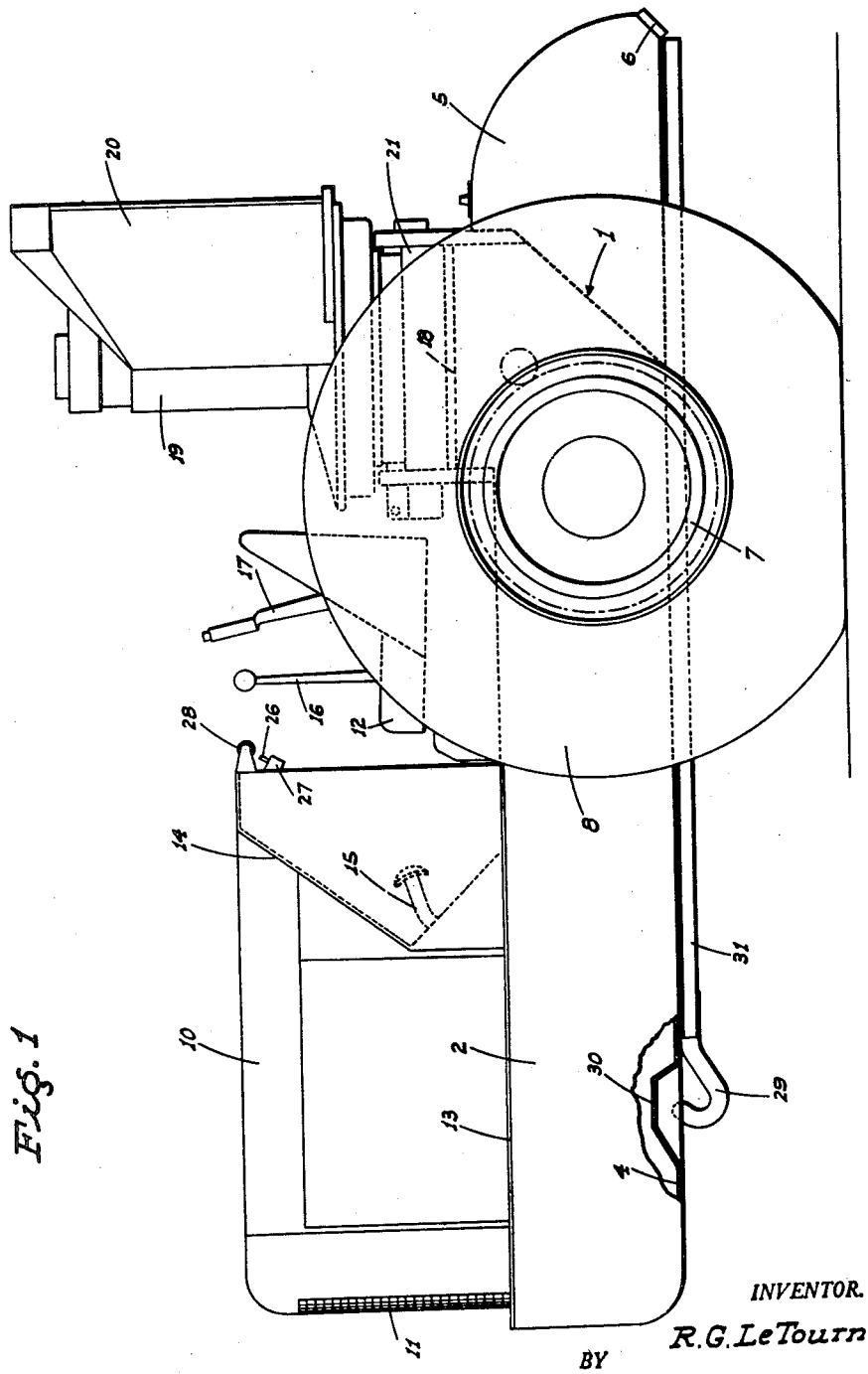
Figure 1 is a side elevation of the improved two-wheel tractor.
Figure 2:
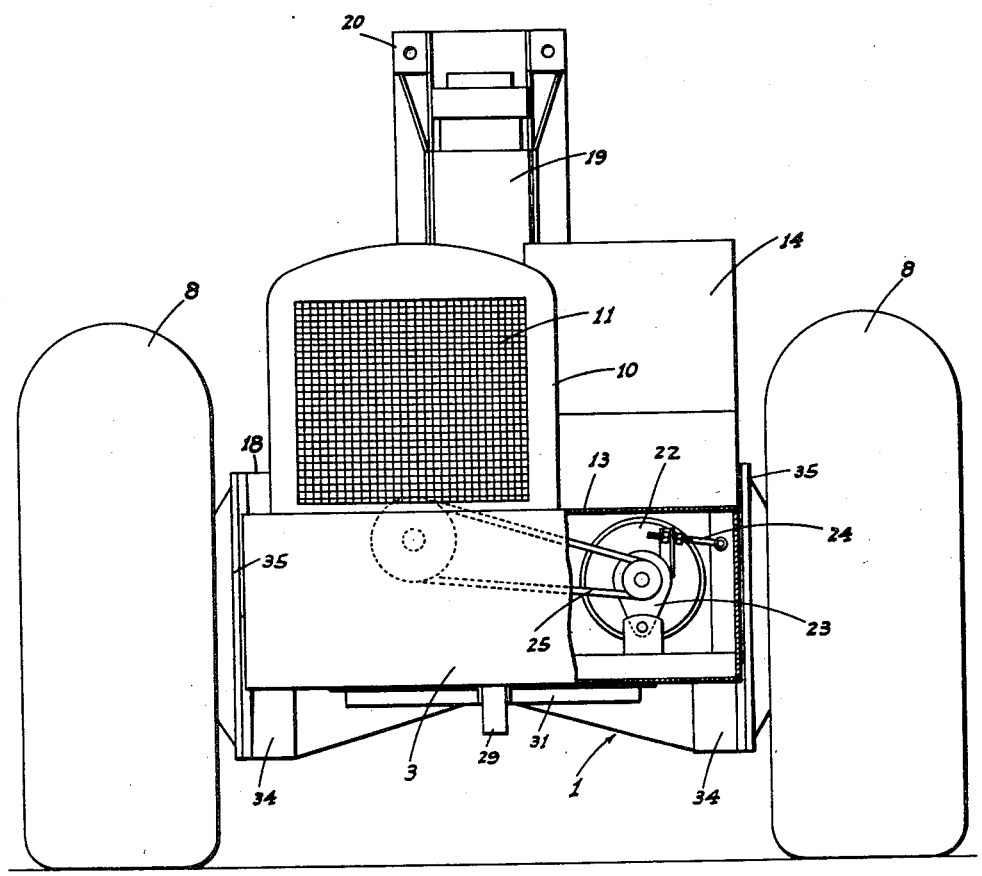
Figure 2 is a front end view of said tractor, partly broken away, to illustrate the adjustable mount for the generator.
Figure 3:
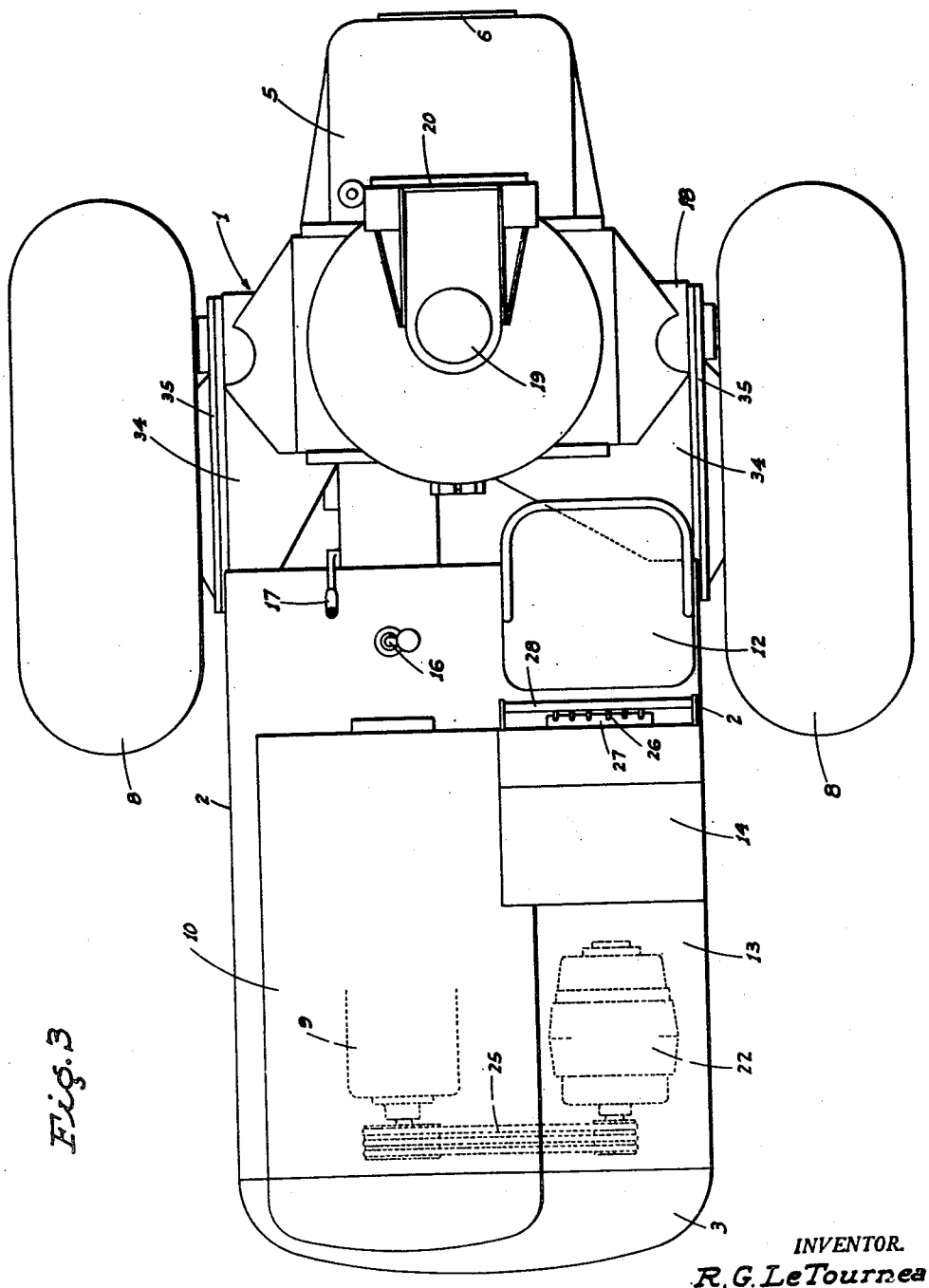
Figure 3 is a plan view.
Figure 4:
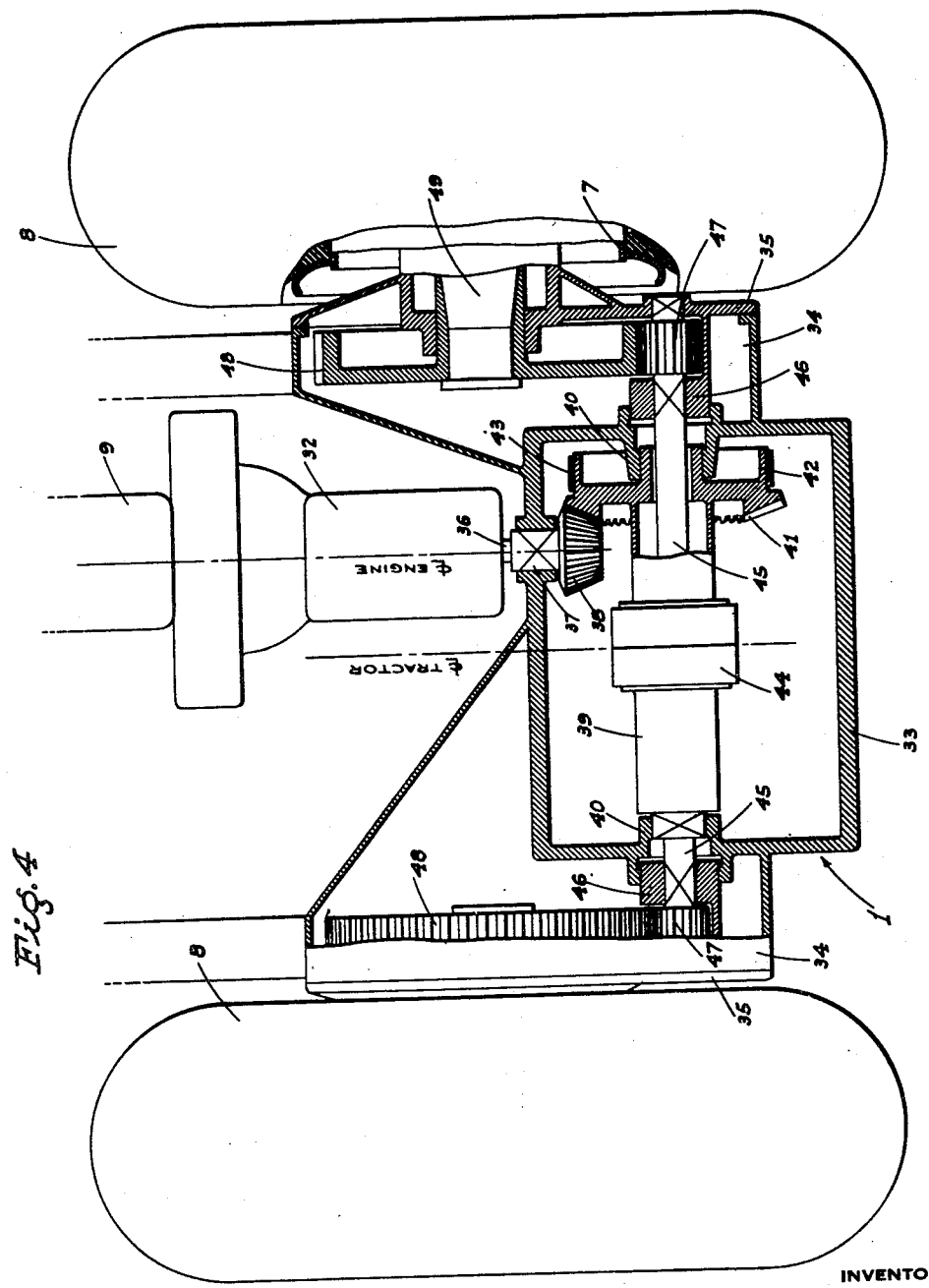
Figure 4 is a fragmentary, mainly diagrammatic plan view, illustrating the final drive assembly in section.

Referring now more particularly to the characters of reference on the drawings, the improved two-wheel tractor comprises a final drive housing, indicated generally at 1, and which housing is of welded sheet steel and thus of heavy-duty construction. At the front thereof the final drive housing 1 is formed with a pair of forwardly projecting, transversely spaced side beams 2 likewise fabricated, by welding, of heavy steel plate; said side beams being connected, at the front, by a unitary cross beam 3. The side beams 2 are connected between the final drive housing 1 and the front cross beam by a bottom pan 4 which forms a unitary part of the frame structure. The above members are welded together, at abutting edges, as a rigid unitary structure.

At the back thereof the final drive housing is formed, in integral relation, with a rearwardly projecting fuel tank 5, which fuel tank is of substantial length, with the bottom thereof in approximately the same horizontal plane as the bottom pan 4. This fuel tank 5 is of rugged construction and serves to prevent the tractor from overturning rearwardly about the axis of its wheels. This results by reason of the fact that the rear end of said fuel tank 5 will engage the ground and serve as a stop before the forward end of the tractor can rise to any point of danger. A ground engaging pad 6 on the tank 5 assures against damage to the latter.

The tractor is supported, adjacent but short of its rear end, by means of a pair of transversely spaced, ground engaging wheels 7 fitted with relatively large size, high-flotation tires 8. The wheels 7 are mounted in connection with the final drive housing 1 in the manner which will hereinafter appear in detail.

An engine 9 is mounted in suitably supported relation in connection with and between the side beams 2; said engine being laterally offset relative to the center line of the tractor, as shown, and is enclosed within a similarly offset hood unit 10, which includes a radiator grille 11.

An operator's seat 12 is mounted on the tractor to the rear of the engine but is laterally offset on the opposite side of the center line of the tractor, whereby an operator on the seat 12 has an unobstructed vision forwardly alongside the hood unit 10. A longitudinal deck 13 is formed on the tractor, ahead of said seat 12 between the offset hood unit 10 and the opposite side beam 2, being secured to and supported by said side beam. A shield 14 is mounted on and upstands from said deck ahead of the seat 12 and in protective relation to the operator. The control pedals 15 of the tractor are disposed within the shield 14, and the shifting lever 16 and hand brake 17 upstand alongside the operator's seat 12, as shown.

The top of the final drive housing 1 forms a rear deck 18, and an upstanding, electrically actuated power steering unit 19 is mounted on said deck; such power steering unit serving also as the means to couple the tractor to a trailing implement, and for this purpose includes a rearwardly facing attachment head 20. The power steering unit 19 is similar to that shown in copending application, Serial No. 569,815, filed December 26, 1944, which issued as Patent No. 2,400,868 on May 28, 1946, and includes a mount, indicated generally at 21, whereby the tractor is laterally tiltable relative to the trailing implement so as to permit the tractor and trailer to follow ground contours independently of each other, while maintaining the tractor against downward tilting at its forward end.

Electricity for the actuation of the power steering unit 19 is derived from a heavy-duty generator 22 mounted below the longitudinal deck 13 between the engine 9 and the opposite side beam 2; said generator being swingably supported by an adjustable mount, indicated generally at 23, which includes an adjustable bolt 24 arranged to tension an endless drive unit 25 connected between the engine crankshaft at the forward end thereof and the corresponding end of the generator shaft. For the purpose of simplicity the electric circuit in which the generator 22 is interposed is not here shown. Such circuit, however, does include a plurality of control switches 26 projecting from a switch box 27 directly beneath a hand grip 28 on the instrument panel of the tractor, and which panel is supported at the upper end of the shield 14. The switches 26 are arranged in said circuit so as to control the power steering unit 19, as well as any electrically actuated mechanisms which the trailing implement may include. In this manner steering of the tractor, as well as operation of said electrically actuated mechanisms on the trailing implement, may be readily controlled by the operator merely by the manipulation of the switches 26, and which can be accomplished by the fingers of the hand which engages the grip 28.

For the purpose of providing means for towing the tractor, and which is sometimes done when the trailing implement is a carry type scraper, and for the purpose of facilitating loading thereof, a forwardly projecting, upwardly opening hook 29 is mounted on the bottom pan 4 adjacent but short of the front end of the tractor, said bottom pan including an upwardly deformed portion 30 to permit of easy engagement of the towing element over the hook 29. In addition to being secured to the bottom pan 4, the hook 29 is likewise attached to a pair of rearwardly extending and diverging stay bars 31 which are fixed to the bottom of the tractor and extend full length thereof to the rear of said hook. The hook 29 and stay bars 31 are welded to the bottom of the pan, and at adjacent ends to each other. By reason of this arrangement, the draft force which is applied to the hook 29 is sufficiently distributed throughout the frame structure to prevent any deflection or buckling of the same.

The engine 9 drives rearwardly through a transmission 32 into a final drive assembly within the housing 1, and which assembly comprises the following:

The final drive housing 1 includes a central case 33 and end cases 34 formed in rigid unitary relation therewith; said end cases 34 being provided with removable end plates 35. The drive shaft 36, from the transmission 32, extends into the central case 33 through a bearing 37, and within said case is fitted with a bevel pinion 38. Rearwardly of the bevel pinion 38 there is a horizontal, transversely extending drive sleeve 39 supported, at opposite ends, by bearing bosses 40 in the ends of the central case 33. Adjacent one end the sleeve 39 is fitted with a bevel drive gear 41 which includes thereon a brake drum 42 surrounded by a brake band unit 43, which brake band unit is under the control of the foot and hand brake accessible to the operator by linkage connections (not shown).

The drive sleeve 39 has a differential 44 interposed therein, and oppositely extending axles 45 lead from the differential 44 through the sleeve 39 and out of the central case 33 through bearings 46 in the ends of the latter. Within the end cases 34 the axles 45 include drive pinions 47 which run in mesh with relatively large-diameter main gears 48 on laterally projecting wheel spindles 49 journaled in said end cases and projecting outwardly therefrom. The pneumatic-tired wheels 7 are secured on said spindles 49.

The described final drive assembly is of simplified but durable construction, and initial assembly thereof, as well as subsequent access for servicing or maintenance, is readily accomplished upon removal of the end plates 35; the interior of said central case 33 being accessible from the end cases 34 when the latter are open.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims:

Having thus described the invention, the following is claimed as new and useful, and upon which Letters Patent are desired:

1. A two-wheel tractor comprising a final drive housing having rigid side beams fixed thereon in transversely spaced, forwardly projecting relation, drive wheels mounted on the housing to the sides of the latter, an engine supported between the side beams ahead of the housing, and driving connections between the engine and wheels including a final drive assembly in said housing; there being a fuel tank on the back of the final drive housing and projecting rearwardly therefrom in normal ground clearance relation, said fuel tank being of rigid, heavy-duty construction and of a length to engage the ground and prevent rearward overturning of the tractor about the axis of the wheels.

2. A two-wheel tractor comprising a final drive housing having rigid side beams fixed thereon in transversely spaced, forwardly projecting relation, a cross beam connecting the side beams at the front end of the latter, a rigid pan extending between the side beams, an upwardly opening, forwardly facing draft hook attached to the pan adjacent but to the rear of said cross beam, drive wheels mounted on the housing to the sides of the latter, an engine above the pan supported between the side beams, and driving connections between the engine and wheels including a final drive assembly in the housing.

3. A two-wheel tractor comprising a final drive housing having rigid side beams fixed thereon in transversely spaced, forwardly projecting relation, a cross beam connecting the side beams at the front end of the latter, a rigid pan extending between the side beams, an upwardly opening, forwardly facing draft hook attached to the pan adjacent but to the rear of said cross beam, drive wheels mounted on the housing to the sides of the latter, an engine above the pan supported between the side beams, and driving connections between the engine and wheels including a final drive assembly in the housing; the pan being deformed upwardly above the draft hook to provide ready access to the latter.

4. A two-wheel tractor comprising a final drive housing having rigid side beams fixed thereon in transversely spaced, forwardly projecting relation, a cross beam connecting the side beams at the front end of the latter, a rigid pan extending between the side beams, an upwardly opening, forwardly facing draft hook attached to the pan adjacent but to the rear of said cross beam, drive wheels mounted on the housing to the sides of the latter, an engine above the pan supported between the side beams, and driving connections between the engine and wheels including a final drive assembly in the housing; there being an elongated stay bar fixed to the draft hook and extending rearwardly under the tractor in rigid connection therewith.

5. A two-wheel tractor comprising a final drive housing having rigid side beams fixed thereon in transversely spaced, forwardly projecting relation, a cross beam connecting the side beams at the front end of the latter, a rigid pan extending between the side beams, an upwardly opening, forwardly facing draft hook attached to the pan adjacent but to the rear of said cross beam, drive wheels mounted on the housing to the sides of the latter, an engine above the pan supported between the side beams, and driving connections between the engine and wheels including a final drive assembly in the housing; there being a pair of elongated stay bars fixed to the draft hook and extending in diverging relation rearwardly under the tractor in rigid connection therewith.

6. In a two-wheel tractor comprising a final drive housing and an engine-supporting structure projecting forward therefrom, an engine supported by such structure, drive wheels mounted on the final drive housing to the sides of the latter, driving connections between the engine and wheels including a final drive assembly in said housing, an electric power steering unit mounted on and upstanding from said final drive housing, a heavy-duty generator for supplying current to said electric power steering unit, means supporting said generator adjacent the engine, and means driving the generator from the engine.

ROBERT G. LE TOURNEAU.

REFERENCES CITED

The following references are of record in the file of this patent:

UNITED STATES PATENTS

| Number | Name | Date |
|---|---|---|
| 864,498 | Wright et al. | Aug. 27, 1907 |
| 1,047,213 | Hanson | Dec. 17, 1912 |
| 1,048,940 | Bushong | Dec. 31, 1912 |
| 1,069,721 | Peterson | Aug. 12, 1913 |
| 1,613,681 | Thompson | Jan. 11, 1927 |
| 1,638,680 | Cook | Aug. 9, 1927 |
| 1,933,540 | Brown | Nov. 7, 1933 |
| 1,945,185 | Eberhard | Jan. 30, 1934 |
| 2,022,916 | Knapp | Dec. 3, 1935 |
| 2,221,546 | Johnston et al. | Nov. 12, 1940 |
| 2,232,992 | Alexander | Feb. 25, 1941 |
| 2,242,046 | Smalley | May 13, 1941 |
| 2,247,668 | Rosenthal | July 1, 1941 |
| 2,262,876 | Baker et al. | Nov. 18, 1941 |
| 2,296,859 | Le Tourneau | Sept. 29, 1942 |
| 2,345,313 | Armington et al. | Mar. 28, 1944 |
| 2,386,483 | Le Tourneau | Oct. 9, 1945 |